United States Patent Office 2,750,369
Patented June 12, 1956

2,750,369

OXIDATION OF ESTERS OF DEHYDROABIETIC ACID

Thomas F. Sanderson, Wilmington, Del., assignor to Hercules Powder Company, Wilmington, Del., a corporation of Delaware No Drawing. Application October 13, 1951, Serial No. 251,250

6 Claims. (Cl. 260—99)

This invention relates to the oxidation of esters of dehydroabietic acid and, more particularly, to a process for oxidizing the ester with chromic acid whereby the oxidative attack occurs chiefly at the 9-position of the dehydroabietic acid nucleus.

It is well-known that rosin may be oxidized by treatment with oxidizing reagents whereby a complex mixture of rosin and oxygenated compounds is produced. However, dehydrogenated or disproportionated rosin is not as readily oxidized, having a more stable molecule, and accordingly requires more drastic conditions for the oxidation reaction.

Now in accordance with this invention, it has been found that an ester of dehydroabietic acid may be oxidized by heating a solution of the ester and chromic acid in an inert organic solvent to a temperature of from about 25° C. to about 100° C. By carrying out the oxidation in this manner, the oxidative attack takes place chiefly at the 9-position of the dehydroabietic acid nucleus to yield an ester of 9-oxodehydroabietic acid as the main product.

The following examples are illustrative of the process in accordance with this invention. All parts and percentages are by weight unless otherwise indicated.

Example 1

Methyl dehydroabietate, 6.28 parts, was dissolved in 75 parts of acetic acid and the solution was heated to 55–58° C. and held at that temperature while a solution of 3.00 parts of chromium trioxide in 5 parts of water and 25 parts acetic acid was slowly added. Agitation was continued for one hour at 58° C., after which the solution was poured into 800 parts of cold water. The precipitate so obtained was extracted with ether and the ethereal solution was washed first with water, then with sodium bicarbonate, again with water, and finally with a sodium chloride solution. On evaporation of the ether, there was obtained 6.35 parts of the product which on analysis was found to contain 66% of methyl 9-oxodehydroabietate.

Example 2

A solution of 1.5 parts of chromium trioxide in 2.5 parts of water and 12.5 parts of acetic acid was added slowly to a solution of 3.14 parts of methyl dehydroabietate in 37.5 parts of acetic acid, the temperature being held at 35° C. during the addition and for 2 hours after the addition was complete. The reaction mixture was then poured into 400 parts of cold water. The product was isolated and purified as described in Example 1. On analysis it was found to contain 57% of methyl 9-oxodehydroabietate.

Example 3

Example 1 was repeated except that the chromium trioxide solution was added to the solution of methyl dehydroabietate at a temperature of 80° C. and the reaction mixture was agitated at that temperature for 2 hours after the addition of the chromium trioxide solution was completed. The product was isolated as in that example and on analysis was found to contain 64% of methyl 9-oxodehydroabietate.

Example 4

Example 1 was repeated except that the amount of chromium trioxide was increased to 4.5 parts instead of the 3.00 parts used in that example and the reaction mixture was agitated for 1.5 hours at 58° C. The product, isolated as in that example, was found on analysis to contain 75% of methyl 9-oxodehydroabietate.

Example 5

To a solution of 31.4 parts of methyl dehydroabietate in 375 parts of acetic acid held at a temperature of 50° C. was added during 2.5 hours a solution of 7.0 parts of chromium trioxide dissolved in a mixture of 30 parts of water and 100 parts of acetic acid. The reaction mixture was then heated for 2 hours at 50° C., after which it was cooled. To the cooled solution was added a solution of 2 parts of sodium bisulfite in 20 parts of water. The reaction mixture was then diluted with water and the precipitate was extracted with ether. The ethereal solution was washed with water, aqueous sodium bicarbonate, again with water, and finally with a saturated sodium chloride solution. On evaporation of the ether, there was obtained 32.0 parts of the oxidized product which on analysis was found to contain 41% of methyl 9-oxodehydroabietate.

Example 6

A solution of 66.7 parts of chromium trioxide in 100 parts of water and 300 parts of acetic acid was added to a solution of 157 parts of methyl dehydroabietate in 1700 parts of glacial acetic acid during a period of 4 hours, the temperature being held at 50° C. during the addition. The reaction mixture was then agitated at 50° C. for an additional 2 hours. After cooling, a solution of 10 parts of sodium bisulfite in 50 parts of water was added and the product was isolated as described in Example 5. The product, 157.1 parts, was found on analysis to contain 52% of methyl 9-oxodehydroabietate.

Example 7

A solution of 33.4 parts of chromium trioxide in 25 parts of water and 75 parts of acetic acid was added during a period of 4 hours to a solution of 78.5 parts of methyl dehydroabietate in 425 parts of acetic acid, the temperature being held at 48°–50° C. during the addition. The reaction mixture was then allowed to stand at room temperature for 16 hours. The product was isolated as in the foregoing examples by dilution of the reaction mixture with water and extraction with ether. The product so obtained, 77.9 parts, was found on analysis to contain 52% of methyl 9-oxodehydroabietate.

Example 8

Methyl dehydroabietate, 78.5 parts, was oxidized as described in Example 7. At the end of the reaction, the reaction mixture was diluted with 1100 parts of warm water (60° C.) and 100 parts of sodium chloride was added and the reaction mixture allowed to stratify. The bottom layer containing water, acetic acid, and chromic salts was drained off and 525 parts of water was added to the upper layer. This mixture was then heated to 60° C. and after addition of 100 parts of sodium chloride was again allowed to stratify. This separation and washing was continued for 3 additional washes, sodium chloride being added each time to assure a clean-cut separation of the two layers. After the last washing, the oxidate was dissolved in ether and the ethereal solution dried. On evaporation of the ether, there was obtained 64.9 parts of the oxidized product which on analysis was found to contain 49% of methyl 9-oxodehydroabietate.

Example 9

A solution of 1.8 parts of chromium trioxide in 5 parts of water and 15 parts of acetic acid was added during a period of 1 hour to a solution of 7.8 parts of a commercial dehydrogenated methyl abietate (49% dehydroabietate) in 85 parts of acetic acid, the temperature being held at 48°–50° C. during the addition. The reaction mixture was then agitated for 1 hour at that temperature, after which it was diluted with water and the product isolated by extraction with ether as described in Example 1. The product so obtained was found on analysis to contain 20% of methyl 9-oxodehydroabietate.

The esters of dehydroabietic acid which are oxidized in accordance with this invention may be prepared from dehydroabietic acid by any of the methods commonly employed in the production of carboxylic acid esters. For example, they may be prepared by esterification of dehydroabietic acid with an alcohol under pressure or by heating an alkali metal dehydroabietate with an alkyl halide. They may also be prepared by esterification of the acid chloride of dehydroabietic acid with an alcohol. The dehydroabietic acid which is so esterified is readily obtained from a dehydrogenated or disproportionated rosin as, for example, by extraction with acetone, ethyl acetate, alcohol, petroleum ether, etc. Instead of the esters of pure dehydroabietic acid, an esterified commercial dehydrogenated or disproportionated rosin may be used, or a commercial rosin ester may be dehydrogenated or disproportionated and used.

While the foregoing examples have shown the oxidation reaction of this invention applied to the methyl ester, any alkyl, hydroxyalkyl, cycloalkyl, aryl, or aralkyl dehydroabietate may be oxidized as, for example, the ethyl, propyl, butyl, hydroxyethyl, glycerol, cyclohexyl, benzyl, etc., esters of dehydroabietic acid, with equivalent results.

In accordance with this invention, an ester of dehydroabietic acid may be oxidized by heating a solution of the ester and chromic acid in an inert organic solvent. Any inert organic solvent may be used as a medium for the reaction provided that a homogeneous reaction mixture is obtained; that is, that it is a solvent for both the ester and the chromic acid solution which is used as the oxidant. Exemplary of the solvents which may be used for carrying out the reaction are carboxylic acids such as acetic acid, propionic acid, dichloroacetic acid, etc., alcohols such as tert-butyl alcohol, etc. Of particular value is an acid such as acetic acid since it is an excellent solvent for the esters of dehydroabietic acid and also dissolves an aqueous chromic acid solution and can also function to furnish salt-forming anions for the chromic ion produced in the reaction. The amount of solvent used in carrying out the reaction is immaterial but should be such an amount that the solution of ester and chromic acid is easily agitated. In general, the amount of solvent which is used is the amount which will form a 5 to 25% solution of the ester. A more concentrated solution may be used but is more difficult to handle. In the same way larger amounts of solvent may be used but are not generally employed because of the bulk of the reaction mixture which must then be handled.

As is well-known, chromic acid exists only in solution and cannot be isolated in the free state. It is formed by dissolving chromium trioxide, which is also known as chromic anhydride, in water. Hence in carrying out the oxidation in accordance with this invention, chromium trioxide must either be dissolved in sufficient water to form the chromic acid and the solution then added to the solution of the ester or there must be sufficient water in the ester solution to form chromic acid when chromium trioxide is added to the ester solution. While larger amounts of water may be present, provided that the reaction mixture remains homogeneous, there need be only the amount required to form chromic acid from the chromium trioxide; that is, one mole of water for every mole of chromium trioxide used in the reaction.

The amount of chromic acid which is used to oxidize the esters of dehydroabietic acid in accordance with this invention may be varied over a wide range depending upon the degree of oxidation desired but in general is an amount of from about 0.7 mole to about 2.5 moles per mole of ester. Larger amounts may be used, in which case oxidation of the isopropyl group in the 7-position of the dehydroabietic acid nucleus may also take place to produce at least minor amounts of the diketone, the ester of 7-acetyl-octahydro-1,4a-dimethyl-9-oxo-1-phenanthrenecarboxylic acid, in addition to the ester of 9-oxodehydroabietic acid.

As pointed out above, the oxidation of an ester of dehydroabietic acid is carried out by heating the ester with chromic acid. In general, the oxidation is carried out at a temperature of from about 25° C. to about 100° C., and preferably from about 35° C. to about 80° C. Higher temperatures may be used if desired, but when used may result in the oxidation of the isopropyl group in the 7-position of the dehydroabietic acid nucleus as well as at the 9-position.

As pointed out above, the chief product present in the oxidate obtained by this oxidation process is an ester of 9-oxodehydroabietic acid. This 9-oxo derivative may be separated from the oxidate by countercurrent extraction with two immiscible solvents or by chromatographing the reaction mixture on an adsorbent using two immiscible solvents whereby a fraction rich in the 9-oxo derivative and a fraction containing the unoxidized ester area readily obtained. The following examples will illustrate the separation of the 9-oxo ester by these methods.

Example 10

The oxidate obtained in Example 7 was dissolved in 130 parts of hexane and the solution was poured on an alumina column. After the concentrated solution of oxidate entered the column, fresh hexane was added continuously and fractions were taken off at periodic intervals. Elution of the column with hexane was continued until no more material was removed from the column, after which the column was eluted with benzene. The material extracted by the benzene was isolated by removal of the benzene and then was crystallized from isooctane whereby 24.1 parts of a white crystalline methyl 9-oxodehydroabietate melting at 67°–68° C. was obtained. This corresponds to a yield of 31% of the starting material or 59% based on the amount of the 9-oxo ester in the starting oxidate.

Example 11

The methyl 9-oxodehydroabietate present in the oxidate obtained in Example 5 was separated by means of countercurrent extraction by dissolving that oxidate in 300 parts of methanol containing 5% of water and equilibrating the solution against 150 parts of isooctane. The aqueous methanol layer was then separated and 150 parts of isooctane added to it. In the same way, a fresh portion of the 5% aqueous methanol was added to the isooctane in the first separator. These solutions were again equilibrated and the layers transferred with fresh portions of solvent added and the solutions equilibrated as before. This procedure was continued through six equilibrations. The aqueous methanol layers were combined and the solvent removed under reduced pressure whereby a fraction amounting to 16.2 parts was obtained which contained 79% of the methyl 9-oxodehydroabietate. The isooctane layers were combined and the solvent removed to yield a fraction amounting to 15.6 parts and containing 2% of the ketone and 92% of unoxidized methyl dehydroabietate.

The foregoing examples have illustrated the separation of the 9-oxo derivative, using in the countercurrent extraction a combination of aqueous methanol and isooctane and in the chromatographic separation, a combination of hexane and benzene. Other solvents or solvent combinations may be used with equivalent results. For example, in the countercurrent extraction any aliphatic or alicyclic hydrocarbon solvents such as hexane, heptane, octane, isooctane, decane, cyclohexane, etc., may be used with the aqueous methanol to effect the separation. The methanol may be replaced by other alcohols or by hydrocarbon-immiscible solvents as, for example, ethanol, the monomethyl ether of ethylene glycol, dioxane, acetone, etc. For the chromatographic separation, solvents other than hexane and benzene may be used as, for example, methylene dichloride, petroleum ether, heptane, isooctane, diethyl ether, cyclohexane, methyl cyclohexane, paramenthane, and dipentene.

The process of this invention provides a method of producing esters of 9-oxodehydroabietic acid in high yields without the production of appreciable amounts of other oxidation products and at the same time by a commercially feasible and economical process. The ester of 9-oxodehydroabietic acid may be isolated from the oxidate obtained by this process or a ketone-rich fraction may be separated and used directly for the syntheses of other dehydroabietic acid derivatives.

What I claim and desire to protect by Letters Patent is:

1. The process of preparing an alkyl ester of 9-oxodehydroabietic acid which comprises heating a solution of an alkyl ester of dehydroabietic acid and chromic acid in an inert organic solvent to a temperature of from about 25° C. to about 100° C.

2. The process of preparing an alkyl ester of 9-oxodehydroabietic acid which comprises heating a solution of an alkyl ester of dehydroabietic acid in an inert organic solvent with from about 0.7 to about 2.5 moles of chromic acid per mole of said alkyl ester of dehydroabietic acid to a temperature of from about 25° C. to about 100° C.

3. The process of preparing an alkyl ester of 9-oxodehydroabietic acid which comprises heating a solution of an alkyl ester of dehydroabietic acid in an inert organic solvent with from about 0.7 to about 2.5 moles of chromic acid per mole of said alkyl ester of dehydroabietic acid to a temperature of from about 35° C. to about 80° C.

4. The process of preparing an alkyl ester of 9-oxodehydroabietic acid which comprises heating a solution of an alkyl dehydroabietate in acetic acid with from about 0.7 to about 2.5 moles of chromic acid per mole of alkyl dehydroabietate to a temperature of from about 35° C. to about 80° C.

5. The process of preparing methyl 9-oxodehydroabietate which comprises heating a solution of methyl dehydroabietate in acetic acid with from about 0.7 to about 2.5 moles of chromic acid per mole of methyl dehydroabietate to a temperature of from about 35° C. to about 80° C.

6. The process of preparing methyl 9-oxodehydroabietate which comprises heating a solution of methyl dehydroabietate in an inert organic solvent with from about 0.7 to about 2.5 moles of chromic acid per mole of methyl dehydroabietate to a temperature of from about 35° C. to about 80° C.

References Cited in the file of this patent

UNITED STATES PATENTS

| | | |
|---|---|---|
| 2,125,772 | Dirscherl | Aug. 2, 1938 |
| 2,275,790 | Miescher et al. | Mar. 10, 1942 |
| 2,383,789 | Harvey | Aug. 28, 1945 |
| 2,434,643 | Drake | Jan. 20, 1948 |
| 2,435,831 | Harvey | Feb. 10, 1948 |

OTHER REFERENCES

Groggins: Unit Processes, 3rd ed., p. 430.
Zeiss: JACS, vol. 70, pp. 858–60 (1948).
Brossi et al.: Helv. Chim. Acta, vol. 33, pp. 1730–45 (1950).
Helv. Chim. Acta, vol. 9, p. 1092 (1926).